United States Patent Office
3,652,523
Patented Mar. 28, 1972

3,652,523
3,3-DIMETHYL-4,5-EPOXYPENTENE-1
AND POLYETHERS THEREOF
Thomas N. Baker III, Philadelphia, and Giovanni A. Bonetti, Wynnewood, Pa., assignors to Atlantic Richfield Company, New York, N.Y.
No Drawing. Filed Mar. 24, 1970, Ser. No. 22,379
Int. Cl. C08f 7/12
U.S. Cl. 260—88.3     3 Claims

ABSTRACT OF THE DISCLOSURE

The novel monomer, 3,3-dimethyl-4,5-epoxypentene-1, and the polyethers prepared therefrom. The polyethers are characterized by having an unsaturated side chain which is amenable to curing, graft polymerization and in particular the production of stable halogenated fire resistant polymers.

BACKGROUND OF THE INVENTION

Field of the invention

This invention relates to a novel monomer having both an oxirane ring and a vinyl group, 3,3-dimethyl-4,5-epoxypentene-1, and in particular to the polyethers prepared therefrom. Since there is no allylic hydrogen in the monomer the polyethers prepared therefrom do not have a hydrogen alpha to the double bond which gives such polymers high stability and permits the production of highly stable derivatives, for example, the halogenated polyethers.

Prior art

The diolefin, 3,3-dimethyl-pentadiene-1,4 is a known compound and the corresponding diepoxide has been reported in the literature. The unsaturated monoepoxide, however, has not been described heretofore and the polymers i.e. the polyethers, of this monomer have not been known heretofore.

SUMMARY OF THE INVENTION

The composition of matter of this invention is 3,3-dimethyl-4,5-epoxypentene-1 having the structural formula:

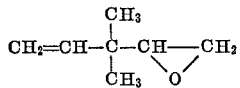

It is prepared by epoxidizing the diolefin, 3,3-dimethyl-pentadiene-1,4 using an organic hydroperoxide and molybdenum-containing catalyst or the older peracid method using, for example, peracetic acid. An excess of olefin over oxidizing agent is employed to insure that only one of the double bonds is epoxidized.

The monoepoxide is polymerized to a homopolymer (polyether) or copolymerized with a low molecular weight epoxide to give a polyether. These polymers have unusual characteristics with respect to stability as will be described.

It is an object of this invention, therefore, to provide a novel monomer, 3,3-dimethyl-4,5-epoxypentene-1.

It is another object of this invention to provide novel polymers of the unsaturated monoepoxide.

It is another object of this invention to provide novel polyethers by copolymerizing the unsaturated monoepoxide with low molecular weight epoxides.

Other objects of this invention will be apparent from the following description of the preferred embodiments and from the claims.

DESCRIPTION OF THE PREFERRED EMBODIMENTS

The novel unsaturated monoepoxide of this invention, i.e., 3,3-dimethyl-4,5-epoxypentene-1 is conveniently produced by reacting an excess of the diolefin (3,3'-dimethyl pentadiene-1,4) with an oxidation agent such as peracetic acid or with an organic hydroperoxide in the presence of molybdenum-containing catalyst. The mole ratio of diolefin to oxidation agent is preferably in excess of 1:1 in order to insure that only one of the double bonds of the diolefin is epoxidized. The preferred mole ratio of diolefin to oxidation agent is 1.2:1 or higher.

When the peracid method is employed temperatures in the range of from 0° C. to 60° C. can be used. It is preferable, however, in accordance with known practice to use temperatures of from 0° C. to 10° C. in order to avoid excessive decomposition of the peracid. Since the diolefin boils at about 71° C. it can be epoxidized by the peracid method at atmospheric pressure.

The unsaturated monoepoxide can also be prepared by reacting the diolefin with an organic hydroperoxide, preferably tertiary butyl hydroperoxide or cumene hydroperoxide utilizing a molybdenum-containing catalyst, for example, molybdenum hexacarbonyl or molybdenyl (VI) acetylacetonate or like compounds which have become well-known in the hydroperoxide-molybdenum catalyst type process. In this process it is preferred to utilize temperatures in the range 75° C. to 125° C. or higher in order to obtain a high yield of epoxide in a reasonably short reaction time. This of course necessitates the use of superatmospheric pressure in order to maintain the reactants in the liquid phase. The pressure employed, therefore, will be determined by the temperature utilized.

The following examples are provided to illustrate methods for preparing the novel compound of this invention, but these methods are merely exemplary of two types of processes and it should be understood that these examples do not represent optimized processes since the processes are not a part of this invention.

EXAMPLE I

Peractic acid

A mixture of 28.8 g. (0.3 mole) 3,3-dimethyl pentadiene-1,4 in 150 ml. of benzene containing 1.5 g. suspended sodium acetate was stirred and heated to 60° C. To this mixture 15.5 g. (0.1 mole) of approximately 50 weight percent peracetic acid was added dropwise at a rate to maintain the 60° C. reaction temperature. An overall reaction time of 1 hour was employed. Iodometric analysis showed that 90 percent of peracetic acid reacted. The reaction mixture was cooled and the acid and hydrocarbon phases were separated. The acid remaining in the organic layer was removed by washing with water, aqueous sodium bicarbonate and finally with water. The product solution in benzene was dried over anhydrous magnesium sulfate. Gas chromatographic analysis of the product solution indicated that the yield of epoxide product was 93 mole percent of theory. Of the epoxide product 95 percent (0.079 moles) was the 3,3-dimethyl-4,5-epoxy pentene-1 and 5 percent was the diepoxide by-product. The desired monoepoxide was isolated by careful distillation on a spinning band column. Benzene and unreacted dimethylpentadiene were removed as the first fraction followed by a heart cut fraction of the desired unsaturated monoepoxide, boiling point 56.5-57.5° C. at 80 mm. Hg pressure (65.5-67° C. at 110 mm.) with 85 percent recovery. Infrared and nuclear magnetic resonance spectra as well as elemental analysis confirmed the assigned structure i.e., 3,3-dimethyl-4,5-epoxypentene-1.

EXAMPLE II

The t-butyl hydroperoxide-molybdenum catalyst method

A mixture of 75.5 g. (0.8 mole) t-butyl hydroperoxide (97 percent purity), 140 g. (1.46 mole) 3,3-dimethyl pentadiene-1,4, 0.3 g. molybdenum hexacarbonyl and 100 ml. of benzene were charged to a 500 ml. stainless steel stirred autoclave. The stirred mixture was pressured to 250 p.s.i. with nitrogen at room temperature. The autoclave was heated rapidly to 84°–88° C. and maintained at this temperature for 4 hours. The reaction was stopped by rapid cooling of the mixture to less than 35° C. Analysis of hydroperoxide iodometrically indicated an 84 percent conversion. Gas chromatographic analysis showed that the yield of epoxide products was 85 mole monoepoxide, 3,3-dimethyl-4,5-epoxy pentene-1 with the remainder being the diepoxide.

In order to recover the desired monoepoxide the crude product was stirred with a mixture of 30 percent aqueous sodium sulfite (80 mole percent excess) for 4 hours at 24°–40° C. to remove any unreacted t-butyl hydroperoxide. The organic layer was separated, washed with water and dried over anhydrous magnesium sulfate. The product was fractionated on a spinning band column and a fraction boiling up to 65° C. at 110 mm. Hg pressure containing unreacted dimethylpentadiene, benzene and t-butyl alcohol was removed. A heart cut fractionation having a boiling point of 65.5–67° C. at 110 mm. was taken and it consisted of the desired 3,3 dimethyl-4,5-epoxy pentene-1 having a purity of over 99 percent with a total recovery of 85 percent showing that this method is the equivalent of the peracetic acid method for producing the unsaturated monoepoxide.

The unsaturated monoepoxide of this invention can be homopolymerized to produce polyethers having a recurring unit

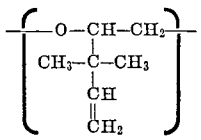

The homopolymers are made by the use of a metal alkyl catalyst preferably the reaction product of the metal alkyl and water. The most preferred catalyst is the reaction production of zinc diethyl and water wherein the mole ration of zinc diethyl to water ranges from 2:1 to 1:1.

The unsaturated monoepoxide can also be copolymerized with a 1,2-epoxyalkane, for example propylene oxide and similar low molecular weight epoxides which are homologues of propylene oxide having up to 6 carbons. The recurring unit has the structure:

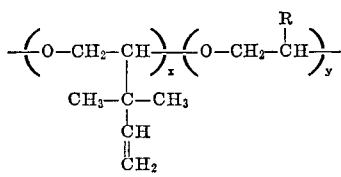

Wherein R is an alkyl radical having 1 to 4 carbon atoms and x and y are integers. The ratio to x to x+y gives the number of the unsaturated units which have been incorporated into the polyether chain. The catalyst employed is preferably the same as that utilized in producing the homopolymers.

It will be noted that both in the homopolymers and the copolymers there is a pendant double bond which is available for further reaction such as curing, halogenation and graft polymerization. The mode of decomposition of many of these materials involves the allylic hydrogen mechanism. Thus the novel feature of these polymer systems is that the resulting materials have added stability because of the absence of hydrogens alpha to the double bond where the new functionality is introduced.

The following examples are provided to show the production of typical homopolymers and copolymers of the novel monomers of this invention.

EXAMPLE III

Homopolymerization of 3,3-dimethyl-4,5-epoxypentene-1

To a dried and nitrogen purged glass polymerization tube was charged 15 ml. of dry benzene and 0.6 mmoles of distilled water. The material was agitated vigorously after which 1.2 mmoles of diethyl zinc in 1 ml. of benzene were added. The material was agitated and aged at room temperature for 2 hours. The 3,3-dimethyl-4,5-epoxypentene-1 monomer (40 mmoles) was added, the tube sealed and the mixture agitated at 80° C. for 24 hours. The tube was cooled, opened and the contents were frozen and the water and benzene were removed by sublimation. A viscous slightly colored liquid (less than 10 weight percent based on the monomer charged) was isolated. The material was a polyether of recurring structural units described above. Because of its viscous nature it is useful as a potting compound.

EXAMPLE IV

Copolymerization of 3,3-dimethyl-4,5-epoxypentene-1 with propylene oxide

There was charged to a flask purged with nitrogen 660 ml. of benzene, 1.13 g. (0.063 mole) distilled water and 7.8 g. (0.063 mole) diethyl zinc in benzene. This catalyst system was aged for 20 hours. To this mixture was charged 116.16 g. (2.0 mole) propylene oxide and 11.8 g. (0.105 m.) of the 3,3-dimethyl-4,5-epoxypentene-1. The temperature was raised to 80° C. and the stirring continued for 4 hours. After this period the stirring was stopped and the reaction temperature maintained at 80° C. for a total of 24 hours. The mixture was then steam distilled to remove benzene. The solid polymer after vacuum oven drying weighed 77.0 g. i.e., 60 percent yield. The inherent viscosity at 30° C., 0.1 percent in benzene was 0.05 dl./g. and the iodine number was determined as 16. These data show that the polymer had a high molecular weight and in addition contained unsaturation because of the pendant double bonds furnished by the unsaturated epoxide which had been incorporated into the polymer. This material is readily susceptible to chlorination or bromination to produce fire resistant materials which because of the lack of allylic hydrogen are very stable and do not split off hydrogen chloride or hydrogen bromide.

We claim:

1. The composition of matter 3,3-dimethyl-4,5-epoxypentene-1 having the structural formula:

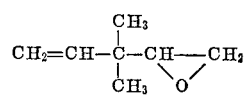

2. A liquid polyether of the composition of claim 1 which is a homopolymer having only the recurring units:

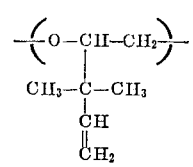

3. A solid polyether of the composition of claim 1 which is a copolymer of said composition with a 1,2-epoxyalkane having from 3 to 6 carbon atoms and has recurring units

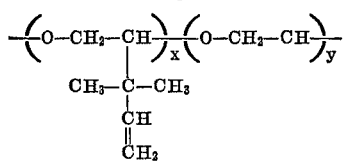
wherein R is an alkyl group having 1 to 4 carbon atoms, x and y are integers and the ratio of x to x and y gives the number of the unsaturated units incorporated into the polyether chain.
References Cited
UNITED STATES PATENTS
3,261,874  7/1966  Stogryn et al. ----- 260—88.3 A
3,398,126  8/1968  Skrypa ---------- 260—88.3 A
HARRY WONG, JR., Primary Examiner
U.S. Cl. X.R.
260—348, 875